Nov. 1, 1960   E. J. CURTIS   2,958,334
APPARATUS FOR TREATING DRINKING WATER FOR
MEDICINAL AND/OR NUTRITIONAL PURPOSES
Filed June 13, 1957   2 Sheets-Sheet 1

Inventor
Edward J. Curtis
by Roberts, Cushman & Grover
Attys

Nov. 1, 1960   E. J. CURTIS   2,958,334
APPARATUS FOR TREATING DRINKING WATER FOR
MEDICINAL AND/OR NUTRITIONAL PURPOSES
Filed June 13, 1957                         2 Sheets-Sheet 2

Inventor
Edward J. Curtis
by Roberts, Cushman & Grover
Attys

United States Patent Office 2,958,334
Patented Nov. 1, 1960

2,958,334

APPARATUS FOR TREATING DRINKING WATER FOR MEDICINAL AND/OR NUTRITIONAL PURPOSES

Edward J. Curtis, 156 Andover St., North Wilmington, Mass.

Filed June 13, 1957, Ser. No. 665,483

3 Claims. (Cl. 137—412)

This invention relates to apparatus for delivery of liquid concentrates of vitamins, hormones, antibiotics and vaccines, of medicinal or nitritional value into drinking water of poultry, livestock and farm animals. The principal objects of the invention are to provide apparatus for automatically delivering, accurately measured quantities of aqueous solutions or dispersions of liquid concentrates having medicinal or nutritional value to drinking water, and wherein delivery and mixing of the concentrate is controlled by the depletion of the treated drinking water as it is used. Other objects are to provide apparaus which can be readily adjusted to provide for different amounts of concentrates depending upon its nature and the extent of animal deficiency. Another object is to provide apparatus which is self-cleaning, thereby to minimize clogging due to particles of extraneous matter which are drawn into the system. Another object is to provide apparatus which is equally adapted for use both by small home farms and by large commercial growers of poultry and livestock. Other objects are to provide apparatus which reduces the time consumed in the manual handling of the concentrates and attendance on stock during periods of treatment. Still other objects are to provide apparatus in which the guess work as to the amount of concentrate being administered is eliminated, which eliminates waste due to the use of more concentrate than required, and which increases the benefits derived from its use by supplying no more nor no less than is required. Still other objects are to provide apparatus which is tamper-proof, dust-proof, durable, dependable, inexpensive to manufacture and maintain, self-contained and easily portable.

As herein illustrated the apparatus comprises a container to which water to be treated is delivered and from which the treated water is withdrawn, and means for controlling pressure at which the water flows into the container between predetermined limits. There is a source of liquid concentrate for mixing in predetermined amount with the water, means operable by the flow of water into the container to draw the concentrate by aspiration into its stream as it flows into the container, and means for metering the amount of concentrate that can be delivered to the stream at any given pressure. Aspiration of the concentrate is effected by a Venturi situated in a conductor extending from the water supply to the container and at the throat of the Venturi there is an inlet port with which there is associated a metering valve for controlling the quantity of concentrtate drawn into the stream of water passing through the Venturi. The metering valve contains a removable part having a metering passage of predetermined cross-section which part may be replaced by others with passages of different cross-section for controlling the quantity of concentrate that may be drawn into the stream for a given pressure. Optionally the metering valve may contain a needle, which is preferred, for control of the flow where smaller quantities are involved and the needle is designed to keep the flow passage clear by vibration therein due to the flow of liquid through the passage. The mixture is delivered from the bottom of the container to float controlled feeders and such delivery may be a gravity feed or may be assisted by a pump provided with a by-pass to return liquid to the container when the feeders are filled. There is a float controlled valve in the supply conductor for shutting off the supply of water to the Venturi when the level of the liquid in the container reaches a predetermined upper level and for opening it to resume flow when the liquid reaches a predetermined lower level.

This invention possesses many advantages for handling and metering liquid concentrates in aqueous solution for other than animal uses. Nutritional feeding of plants or flowers through aqueous medium, nutritional feeding of marine and aquatic plants and life, medications through aqueous solutions or suspensions, and many other uses for feeding and medicating through drinking water.

The apparatus will now be described in detail with reference to the accompanying drawings wherein.

Figure 1:
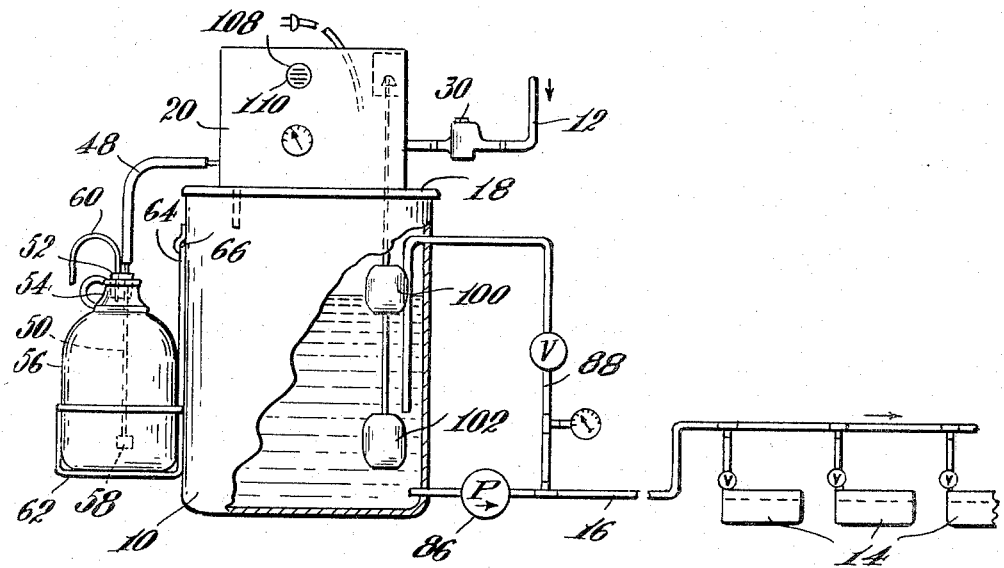
Fig. 1 is an elevation of the apparatus partly in section.

The purpose of the invention, as previously pointed out, is to mix with drinking water, which is to be supplied to poultry or farm animals a medicant or other beneficial substance which is soluble in the water. Fig. 1 shows a large capacity container 10, such as a 5 or 10 gallon bucket to which water may be supplied from a city main or other source of water supply through a conduit 12 and from which the water mixed with a suitable additive may be conducted to a series of float control feeders 14 by a conduit 16. The bucket is preferably galvanized or coated with a protective material to resist the corrosive action of the substance employed.

Figure 2:
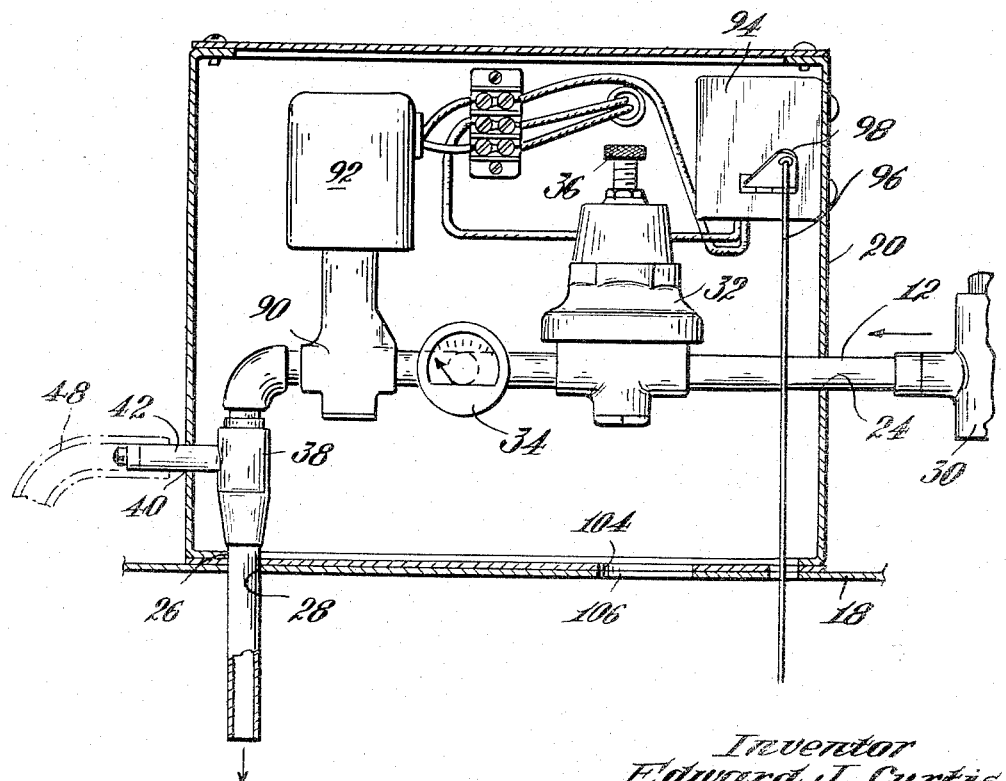
Fig. 2 is an enlarged elevation of the control means.

To exclude dust, dirt and other contaminating material the container 10 is preferably tightly closed by means of a cover 18 (Fig. 1), which provides a convenient support for the control mechanism which is largely concealed within a dust proof sheet metal box 20, fastened to the top of the cover. As illustrated in Fig. 2, the conductor 12 enters the side of the box 20 through an opening 24 and leaves the box through an opening 26 in its bottom wall and through a registering opening 8 in the cover 18. Externally of the box in the conductor 12 there is a strainer or filter 30 to trap in so far as possible foreign matter which may be brought to the apparatus, especially if the water supply is a domestic or private supply.

Figure 4:
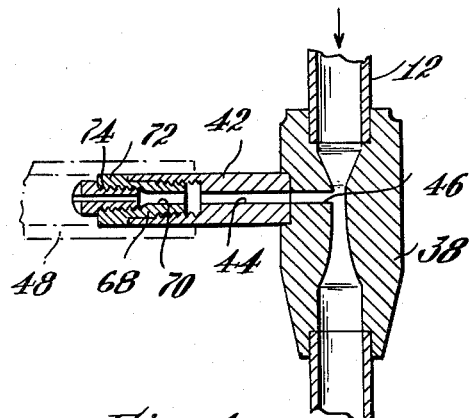
Fig. 4 is an enlarged fragmentary section of the Venturi and metering means.
Figure 5:
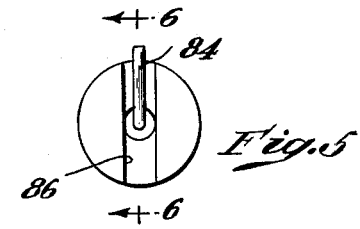
Fig. 5 is an enlarged elevation of the metering valve as seen from the left side of Fig. 4 with the feed tube removed.

Within the box there is a pressure regulator 32 and a calibrated gauge 34. Under operating conditions it is found that best results, for consistently accurate metering of the additive to the water, a pressure should be maintained which is between 25 and 40 pounds per square inch. The pressure regulator 32 is accordingly adjusted by means of the knurled valve member 36 until the gauge shows a pressure reading of the needle which lies between graduations of 20 to 40 pounds pressure. The water delivered from the supply through the pressure regulator 32 flows through a Venturi 38, also within the box, just before it is discharged into the container. The Venturi, as shown in Fig. 4, has extending laterally from one side through an opening 40 in the side of the box a nipple 42, the latter having an axial passage 44 which registers with a port opening 46 in the Venturi at the Venturi throat. A flexible feed tube 48 is slipped over the end of the nipple 42 and extends outwardly and downwardly from the box and is connected at its lower end to a tube 50 secured at its upper end in a stopper 52. The stopper is fixed in the neck 54 of a bottle 56, for example, a gallon bottle or jug. The lower end of the tube 50 preferably has on it a strainer 58 (Fig. 1). A bent tube 60 is also set into the stopper 52 so as to prevent formation of a vacuum within the jug and to permit withdrawal of the content of the bottle by the aspirating affect of the Venturi. In conventional and well known fashion flow of water through the Venturi creates a suction or aspirating affect which draws liquid in the bottle upwardly through the tube 50 and feed tube 48, through the nipple 42 and into the stream of water, where it becomes mixed with the water and is discharged into the container 10.

A bracket 62 (Fig. 1) is arranged to receive the bottom of the bottle and is preferably suspended on the side of the container by means of a bale 64 extending through an eye 66 fastened to the side thereof so that the bottle will not accidentally be tipped over. The use of a gallon bottle or jug is preferred because it is easy to handle, easy to refill and since it is transparent it is easy to keep track of how much fluid it contains at any given time.

Figure 6:
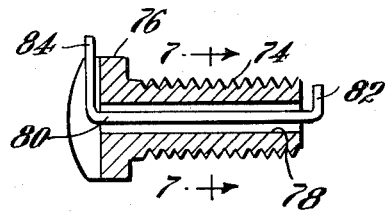
Fig. 6 is a section taken on the line 6—6 of Fig. 5.

The regulation of the water pressure by means of the pressure regulator 32 provides for drawing a maximum quantity of fluid from the bottle for a given pressure but does not provide for varying the quantity for this maximum. The quantity of additive mixed with the water is highly important to insure beneficial results and must be kept within fairly close and known limits. Moreover most of these additives are expensive and hence it is sound business procedure to avoid unnecessary waste. Accordingly metering means is provided between the bottle and the Venturi in the form of a metering valve which may be adjusted to vary the quantity of liquid which may be withdrawn from the bottle with a high degree of accuracy. The metering valve is shown in detail in Figs. 4 to 8 inclusive, and is removably secured to the nipple 42, the latter for this purpose having its outer end drilled and threaded internally so as to receive a hollow plug or sleeve 68, threaded externally at one end so as to mate with the threading in the nipple and having an axial passage 70. The outer end of the sleeve 68 is provided with an enlarged head 72 by which it may be grasped, for example with pliers or a wrench to introduce or remove it from the nipple 42. The outer end of the sleeve 68 is also internally threaded to receive a valve screw 74. The valve screw (Fig. 6) has a threaded body adapted to be screwed into the internally threaded portion of the sleeve 68 and has a head 76 for limiting its position within the sleeve. The valve screw has an axial passage 78 drilled through it which has an accurately dimensioned cross-section so as to control the flow of liquid through it to a predetermined amount at the pressure supplied by the Venturi. For conditions where the amount of additive is fairly large the desired control may be effected solely by means of a valve screw wherein the axial passage 78 is drilled accurately to a given diameter. Variation in quantity may be taken care of solely by using a number of such screws having axial passages of different cross-section. It is to be observed that the metering valve screw is located at the end of the nipple 42 within the flexible feed tube 48 so as to be completely concealed thereby, and thus free from dust and dirt and from unauthorized tampering.

Figure 8:
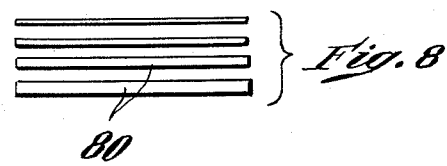
Fig. 8 shows a group of several different size metering pins.
Figure 7:
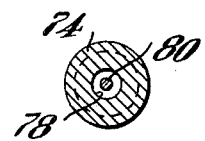
Fig. 7 is a section taken on the line 7—7 of Fig. 6.

When the quantity of additive is small it is found that it is difficult to control the diameter or cross-section of the axial passage 78 even with careful machining; accordingly, as shown in Figs. 5 to 8 inclusive, a pin or needle 80 may be used in conjunction therewith. When the needle is employed the screw valve is provided with an axial passage 78 of given cross-section and there is then placed in the passage a needle 80 having a diameter of known cross-section, which will thus be subtracted from the axial passage 78. The diameter of the needle 80 may be controlled to a much closer degree than the internal diameter of the passage 78. Several pins of various diameters are shown in Fig. 8 and conveniently the pin is held within the screw by bending its opposite ends 82 and 84 laterally. Preferably the head of the screw contains a diametrical curf 86 within which the outer end of the pin is bent and which prevents rotation of the pin within its passage. The pin has in addition to its advantage of close control of the additive where small quantities are employed the advantage as acting as a self-cleaner for the valve. This feature results from a vibration of the needle within the passage produced by the flow of fluid therethrough, so that if by chance any particles are not removed by the filtering element 58 and are carried up into the valve screw there is a good chance that they will not become lodged in the passage 78 permanently but will be dislodged by the vibration of the needle.

Figure 3:
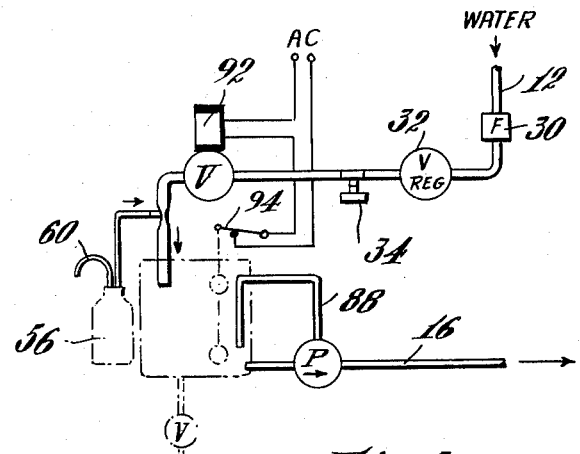
Fig. 3 is a diagrammatic view of the control means.

The mixture in the container 10 is as pointed out delivered through a conduit 16 to a plurality of float control feeding troughs 14. When the container 10 may be placed at a high level, for example, in the loft of a barn or on the second or third story of a several story chicken house, sufficient pressure is available to insure delivery of the mixture from the container through the conduit 16 to the various float controlled feeders solely by gravity. In small installations particularly where the container must be placed at ground level or at substantially ground level it is necessary to employ an auxiliary pump in the conductor 16 to insure flow of the mixture from the container to the feeders. Accordingly, if necessary a pump 86 (Figs. 1 and 3) is placed in the conductor 16 adjacent the receptacle 10. Since the feeders are float controlled as soon as they become filled to a given level the valves associated therewith are closed so as to prevent further delivery of fluid from the container 10. At certain times of course most or all of these feeders will be filled and accordingly a by-pass must be provided to permit return of the fluid discharged by the pump to the container. Accordingly, a branch conduit 88 is connected to the conduit 16 ahead of the pump in the direction of the feeders which conduit enters the container near the top and extends downwardly therein so that when there is no need for delivery of mixture to the feeders the pump will merely circulate the mixture through the by-pass and back into the container.

It is also desirable to cut off the flow of water through the Venturi to the container when there is no call for additional mixture from the feeders to prevent overflow. To this end a valve 90 (Fig. 2) is placed in the conductor 12 within the box which is controlled by a solenoid 92. The solenoid is connected to a suitable source of current and to a float control switch 94 which is operable when the level of the mixture within the container rises to a certain height to actuate the solenoid thereby to close the valve in the conduit 12. When the mixture begins to be drawn from the container into the feeders and reaches a predetermined low level the switch is again actuated to energize the solenoid and open the valve so as to permit water to flow through the Venturi and into the container. A special type of float control means for actuating the valve is employed in the form of a cord 96 (Figs. 1, 2 and 3) connected at its upper end to a switch actuating arm 98 and supporting at its lower end a pair of vertically spaced floats 100 and 102. The arrangement of the floats in spaced relation produces a quick action switch, that is, as the level of the mixture in the container falls it first exposes the upper float 100. Its weight however is not sufficient to actuate the switch arm until the level of the water reaches the lower float 102. As the second float begins to be exposed the combined weights suddenly actuate the switch arm. In the reverse direction as the water begins to rise the buoyancy of the lower float is not sufficient to actuate the arm and hence the level rises all the way to the second float before the added bouyancy of the second float in combination with that of the first suddenly actuates the switch arm. This construction avoids the use of a lever arm such as is commonly employed for float control apparatus.

Withdrawal of the mixture from the container 10 naturally tends to produce a vacuum in the container and in like manner when water is delivered to the container the air within it must be displaced. In order to prevent difficulties from either of these conditions the top of the cover and the bottom of the box have registering openings 104 and 106, so that the pressure within the container will be the same as that within the box and the latter is provided in one wall with a vent opening 108 (Fig. 1) which is covered with a louver 110. Preferably a fine screen or other filtering element is placed behind the louver so as to intercept dust and dirt. It is particularly important for continued and satisfactory operation of the apparatus that dust and dirt be excluded from the container and from the operating mechanism and hence the precautions of providing a sealed container and box which is particularly necessary because poultry and animal shelters are notoriously dusty.

From the foregoing it is apparent that a very compact, practical and portable piece of equipment is available for use not only to commercial producers but also by individual farmers where only a few animals are raised. On small farms a single unit suffices whereas on larger farms several units may be employed if there are several buildings. The apparatus may be enlarged without changing the character of its operation nor departing from the scope of the invention as herein illustrated.

It should be understood that the present disclosure is for the purpose of illustration only and that this invention includes all modifications and equivalents which fall within the scope of the appended claims.

I claim:

1. Apparatus for treating water comprising a portable mixing container, a conductor having an inlet end for connection to a source of water and a discharge end opening into said container, an aspirator in the conductor near the discharge end which includes an inlet nipple for water treating additive, means in the conductor near the inlet end for controlling the pressure at which the water flows through the aspirator, an electrically controlled valve located in the conductor between the pressure regulating means and the aspirator, an electric switch connected to said valve, a float mechanism for operating said switch which includes a light and very buoyant float and a comparatively heavy float of more or less neutral buoyancy, said floats being connected together with the light float above the heavy float by a rigid rod, a receptacle attached to the outside of said container for holding the water additive, a feed tube extending from the receptacle to said nipple of the aspirator, and means located within said nipple for metering the flow of additive into the water flow, said metering means including an accurately drilled orifice and, loosely held therein, a pin of accurately defined cross section.

2. Apparatus according to claim 1 wherein said metering means is a threaded plug adapted to be screwed into the nipple and to be enclosed within the feed tube so as to be concealed thereby and yet to be readily accessible by pulling the feed tube off of the nipple.

3. Apparatus according to claim 1 wherein there is means preventing axial movement of the needle in the orifice while permitting rotation thereof.

References Cited in the file of this patent

UNITED STATES PATENTS

| | | |
|---|---|---|
| 726,395 | Redworth et al. | Apr. 28, 1903 |
| 2,533,907 | Anderson | Dec. 12, 1950 |
| 2,610,643 | Goff | Sept. 16, 1952 |
| 2,710,016 | Gallmeyer | June 7, 1955 |
| 2,789,573 | Glass | Apr. 23, 1957 |